(12) United States Patent
Kouda

(10) Patent No.: US 10,870,318 B2
(45) Date of Patent: Dec. 22, 2020

(54) PNEUMATIC TIRE

(71) Applicant: The Yokohama Rubber Co., LTD., Minato-ku, Tokyo (JP)

(72) Inventor: Hiraku Kouda, Hiratsuka (JP)

(73) Assignee: The Yokohama Rubber Co., LTD.

( * ) Notice: Subject to any disclaimer, the term of this patent is extended or adjusted under 35 U.S.C. 154(b) by 260 days.

(21) Appl. No.: 15/757,294

(22) PCT Filed: Jul. 27, 2016

(86) PCT No.: PCT/JP2016/071973
§ 371 (c)(1),
(2) Date: Mar. 2, 2018

(87) PCT Pub. No.: WO2017/043205
PCT Pub. Date: Mar. 16, 2017

(65) Prior Publication Data
US 2018/0257439 A1    Sep. 13, 2018

(30) Foreign Application Priority Data

Sep. 10, 2015  (JP) .................................. 2015-178594

(51) Int. Cl.
*B60C 17/00*     (2006.01)
*B60C 17/08*     (2006.01)
(Continued)

(52) U.S. Cl.
CPC ................. *B60C 17/08* (2013.01); *B60C 3/06* (2013.01); *B60C 5/00* (2013.01); *B60C 9/00* (2013.01);
(Continued)

(58) Field of Classification Search
CPC ......... B60C 17/08; B60C 17/009; B60C 3/06; B60C 9/0292; B60C 13/003
(Continued)

(56) References Cited

U.S. PATENT DOCUMENTS 2,572,259 A * 10/1951 Gottschall ............... B60C 13/04
152/523
4,203,481 A *  5/1980 Ranik, Jr. ............... B60B 21/10
152/375
(Continued)

FOREIGN PATENT DOCUMENTS

JP    S61-157402    7/1986
JP    S62-71707     4/1987
(Continued)

OTHER PUBLICATIONS

International Search Report for International Application No. PCT/JP2016/071973 dated Sep. 20, 2016, 4 pages, Japan.

*Primary Examiner* — Robert C Dye
*Assistant Examiner* — Edgaredmanuel Troche
(74) *Attorney, Agent, or Firm* — Thorpe North & Western

(57) ABSTRACT

A pneumatic tire has a designated vehicle inner/outer side orientation for when mounted on a vehicle, and includes: a reinforcing rubber layer disposed in sidewall portions on sides in a tire lateral direction, the reinforcing rubber layer having a crescent shaped meridian cross-section; wherein a radius of curvature with an arc joining intersections of straight lines and a tire external contour, and a radius of curvature with an arc joining intersections of the straight lines and a carcass layer have a relationship such that, on the vehicle outer side, a radius of curvature of the carcass layer is large with respect to a radius of curvature of the tire external contour, and on the vehicle inner side, a radius of curvature of the carcass layer is small with respect to a radius of curvature of the tire external contour.

22 Claims, 4 Drawing Sheets

(51) Int. Cl.
*B60C 9/00* (2006.01)
*B60C 9/08* (2006.01)
*B60C 5/00* (2006.01)
*B60C 3/06* (2006.01)
*B60C 9/17* (2006.01)
*B60C 9/02* (2006.01)
*B60C 13/00* (2006.01)

(52) U.S. Cl.
CPC .............. *B60C 9/0292* (2013.01); *B60C 9/08* (2013.01); *B60C 9/17* (2013.01); *B60C 13/003* (2013.01); *B60C 17/00* (2013.01); *B60C 17/0009* (2013.01); *B60C 2017/0054* (2013.01); *B60C 2017/0072* (2013.01)

(58) Field of Classification Search
USPC ........................................................ 152/522
See application file for complete search history.

(56) References Cited

U.S. PATENT DOCUMENTS

| | | | |
|---|---|---|---|
| 5,299,615 A * | 4/1994 | Ataka | B60C 13/00 152/454 |
| 7,918,257 B2 * | 4/2011 | Segawa | B60C 11/033 152/516 |
| 8,371,351 B2 * | 2/2013 | Ito | B60C 13/003 152/456 |
| 2002/0000279 A1 | 1/2002 | Tobino et al. | |
| 2003/0116249 A1 | 6/2003 | Tobino et al. | |
| 2007/0012391 A1 * | 1/2007 | Willard, Jr. | B60C 17/0009 152/455 |
| 2010/0252161 A1 | 10/2010 | Ito | |
| 2013/0327458 A1 * | 12/2013 | Ohno | B60C 11/0304 152/209.1 |

FOREIGN PATENT DOCUMENTS

| | | |
|---|---|---|
| JP | 2000-289409 | 10/2000 |
| JP | 2001-322410 | 11/2001 |
| JP | 2006-231961 | 9/2006 |
| JP | 2007-069890 | 3/2007 |
| JP | 2009-018771 | 1/2009 |
| JP | 2011-235812 | 11/2011 |
| WO | WO 2009/057781 | 5/2009 |
| WO | WO 2012/120826 | 9/2012 |
| WO | WO 2016/117273 | 7/2016 |
| WO | WO 2016/117274 | 7/2016 |

* cited by examiner

FIG. 4

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|---|---|---|---|---|---|---|---|
| RELATIONSHIP BETWEEN ROout AND RPout (THE LARGER IS SHOWN) | EQUAL | ROout | RPout | RPout | RPout | RPout | RPout | RPout | RPout | RPout | RPout | RPout | RPout | RPout | RPout | RPout | RPout |
| ROout/RPout | 1.0 | 0.99 | 1.03 | 1.2 | 2.5 | 2.5 | 2.5 | 1.5 | 1.5 | 2.0 | 1.03 | 2.0 | 2.0 | 2.0 | 2.0 | 2.0 | 2.0 |
| ACTUAL SIZE OF RPout (mm) | 67 | 66 | 69 | 69 | 151 | 151 | 151 | 101 | 101 | 134 | 69 | 134 | 134 | 134 | 134 | 134 | 134 |
| RELATIONSHIP BETWEEN ROin AND RPin (THE SMALLER IS SHOWN) | EQUAL | ROin | RPin | RPin | RPin | RPin | RPin | RPin | RPin | RPin | RPin | RPin | RPin | RPin | RPin | RPin | RPin |
| RPin/ROin | 1.0 | 1.03 | 0.99 | 0.99 | 0.99 | 0.4 | 0.9 | 0.99 | 0.8 | 0.6 | 0.5 | 0.99 | 0.6 | 0.6 | 0.6 | 0.6 | 0.6 |
| ACTUAL SIZE OF RPin (mm) | 67 | 69 | 66 | 66 | 79 | 29 | 78 | 66 | 54 | 40 | 34 | 66 | 40 | 40 | 40 | 40 | 40 |
| RPout/RPin | 1.0 | 0.95 | 1.05 | 1.05 | 1.9 | 5.2 | 1.9 | 1.5 | 1.9 | 3.3 | 2.1 | 2.0 | 3.3 | 3.3 | 3.3 | 3.3 | 3.3 |
| GAin-GAout (mm) | 0 | 0 | 0 | 0 | 0 | 0 | 0 | 0 | 0 | 0 | 0 | 0 | 3.0 | 3.0 | 1.0 | 5.0 | 3.0 |
| GAin (mm) | 9.0 | 9.0 | 9.0 | 9.0 | 9.0 | 9.0 | 9.0 | 9.0 | 9.0 | 9.0 | 9.0 | 9.0 | 11.0 | 15.0 | 10.0 | 21.0 | 15.0 |
| CARCASS CORDS | RAYON | RAYON | RAYON | RAYON | RAYON | RAYON | RAYON | RAYON | RAYON | RAYON | RAYON | RAYON | RAYON | RAYON | RAYON | RAYON | POLYESTER |
| RUN-FLAT DURABILITY PERFORMANCE | 100 | 100 | 100 | 100 | 102 | 100 | 100 | 100 | 100 | 100 | 100 | 100 | 105 | 110 | 105 | 113 | 108 |
| STEERING STABILITY PERFORMANCE | 100 | 97 | 103 | 104 | 104 | 104 | 105 | 105 | 105 | 110 | 103 | 110 | 110 | 110 | 108 | 110 | 108 |
| RIDE COMFORT PERFORMANCE | 100 | 97 | 103 | 103 | 102 | 102 | 102 | 103 | 105 | 108 | 110 | 103 | 108 | 108 | 108 | 106 | 106 |
| ROLLING RESISTANCE REDUCTION PERFORMANCE | 100 | 100 | 103 | 100 | 100 | 100 | 100 | 100 | 103 | 103 | 105 | 100 | 110 | 108 | 108 | 105 | 110 |

PNEUMATIC TIRE

TECHNICAL FIELD

The present technology relates to a pneumatic tire capable of run-flat travel.

BACKGROUND ART

Pneumatic tires are mounted on rims, inflated with air, and mounted on a vehicle. When a vehicle is traveling, it is this internal air pressure that bears the load. However, upon puncture or the like, air escapes from the pneumatic tire rendering the tire unsuitable to bear the load. Specifically, the load supported by the air pressure becomes supported by the sidewall portions, causing the sidewall portions to greatly deform. As a result, travel is impeded.

Pneumatic tires are known that take into account such issues. Such tires are capable of run-flat travel (traveling in a deflated state due to a puncture or the like) and are provided with a reinforcing rubber layer on the inside of the sidewall portions which increases the bending rigidity of the sidewall portions. In other words, deformation of the sidewall portions of such pneumatic tires is suppressed, allowing the pneumatic tire to travel even in a state in which some of the air in the pneumatic tire has escaped and a large load is borne by the sidewall portions.

Tires in the related art, such as the pneumatic tire described in Japanese Unexamined Patent Application Publication No. 2000-289409, have an object of improving the performance of run-flat travel by improving a sectional shape of the tire to obtain an optimal sectional shape by which maximum stress applied to the tire can be reduced while minimizing increase in tire weight. This pneumatic tire satisfies expressions below:

$Ra/D \leq 0.08$;

$Rb/D \leq 0.08$;

$0 < \varphi a \leq 50$ deg.; and $0 < \varphi b \leq 50$ deg.;

where, in a tire meridional section in a standard state in which the tire is mounted on a standard wheel rim, inflated to the standard internal pressure, and not loaded, Ra is a radius of curvature of a first arc having a center Oa on a tire axial direction line X passing through a midpoint between a first point A and a second point B and on a tire inner cavity side and in contact with a tire center line at the first point A, the first point A being a point where a tire radial direction line Y passing through a wheel rim width position of the standard wheel rim intersects the tire center line passing through a midpoint of a thickness of the tire on a tread portion side and a second point B being a point where the tire radial direction line Y intersects the tire center line on a bead portion side, Rb is a radius of curvature of a second arc having a center Ob on the tire axial direction line X and on the tire inner cavity side and in contact with the tire center line at the second point B, φa is an angle formed by the tire axial direction line X and a straight line Oa-A connecting the center Oa and the first point A, φb is an angle formed by the tire axial direction line X and a straight line Ob-B connecting the center Ob and the second point B, and D is an outer diameter of the tire in the standard state.

Additionally, in the related art, Japanese Unexamined Patent Application Publication No. 2007-069890 describes a run-flat tire designed to reduce the tire weight by adjusting the position of the tire maximum cross-sectional width and the profile of the tire outer surface.

Additionally, in the related art, Japanese Unexamined Patent Application Publication No. 2001-322410 describes a run-flat tire designed to reduce the tire weight by adjusting the position of the tire maximum cross-sectional width and the cross-sectional width of the substantially crescent shaped reinforcing rubber layer (second reinforcing rubber layer) as viewed in a meridian cross-section.

However, though the steering stability performance of pneumatic tires capable of run-flat travel can be increased by increasing the thickness of the reinforcing rubber layer in the tire lateral direction to increase the vertical stiffness in the tire radial direction, such an increase in the thickness of the reinforcing rubber layer leads to an increase in the volume of the reinforcing rubber layer, which tends to cause an increase in rolling resistance. On the other hand, reducing the thickness of the reinforcing rubber in the tire lateral direction to reduce rolling resistance tends to cause a decrease in durability performance when run-flat traveling (run-flat durability performance).

Pneumatic tires capable of run-flat traveling are typically provided with a reinforcing rubber layer thicker in the tire lateral direction to retain good durability performance with run-flat traveling (run-flat durability performance), thus increasing the vertical stiffness in the tire radial direction, which tends to decrease ride comfort.

SUMMARY

The present technology provides a pneumatic tire that can provide enhanced run-flat durability performance, steering stability performance, and ride comfort, without the rolling resistance being degraded.

A pneumatic tire according to an embodiment of the present technology is a pneumatic tire with a designated vehicle inner/outer side orientation for when mounted on a vehicle, the pneumatic tire comprising:

a reinforcing rubber layer disposed in sidewall portions on both sides in a tire lateral direction, the reinforcing rubber layer having a substantially crescent shaped meridian cross-section; wherein when the tire is mounted on a regular rim, has an internal pressure of 0 kPa, and is in an unloaded state, a radius of curvature RO with an arc joining intersections Oa, Ob, Oc of straight lines La, Lb, Lc and a tire external contour, and a radius of curvature RP with an arc joining intersections Pa, Pb, Pc of the straight lines La, Lb, Lc and a carcass layer have a relationship such that, on the vehicle outer side, a radius of curvature RPout of the carcass layer is large with respect to a radius of curvature ROout of the tire external contour, and on the vehicle inner side, a radius of curvature RPin of the carcass layer is small with respect to a radius of curvature ROin of the tire external contour, where the straight line Lc is a straight line orthogonal to a tire equatorial plane at a tire maximum width portion when viewed in a meridian cross section, the straight line La is a straight line from an intersection of the straight line Lc and the tire equatorial plane inclined by 10° outward in a tire radial direction with respect to the straight line Lc, and the straight line Lb is a straight line from the intersection of the straight line Lc and the tire equatorial plane inclined by 10° inward in the tire radial direction with respect to the straight line Lc.

When the radius of curvature RP of the carcass layer is greater than the radius of curvature RO of the tire external contour, tensile strength in the tire radial direction of the carcass layer tends to increase and vertical stiffness, i.e. elasticity in the tire radial direction, increases. As a result, both good run-flat durability performance and steering stability performance can be obtained without increasing the cross-sectional thickness of the reinforcing rubber layer, which contributes to enabling run-flat travel. Moreover, by removing the need to increase the cross-sectional thickness of the reinforcing rubber layer, which contributes to enabling run-flat travel, degradation of the rolling resistance can be suppressed. As a result, run-flat durability performance and steering stability performance can be enhanced without the rolling resistance being degraded. However, obtaining significant effects mainly depends on the vehicle outer side, and when the vehicle inner side is configured in this manner, the effect of improving steering stability performance tends to be difficult to obtain. Thus, on the vehicle outer side, by making the radius of curvature RPout of the carcass layer large with respect to the radius of curvature ROout of the tire external contour, a significant effect of enhancing run-flat durability performance and steering stability performance can be obtained.

When the radius of curvature RP of the carcass layer is smaller than the radius of curvature RO of the tire external contour, tensile strength in the tire radial direction of the carcass layer tends to decrease and vertical stiffness, i.e. elasticity in the tire radial direction, decreases. As a result, ride comfort can be improved while retaining good run-flat traveling without decreasing the cross-sectional thickness of the reinforcing rubber layer, which contributes to enabling run-flat travel. As a result, good run-flat durability performance and ride comfort can be achieved in a compatible manner. However, obtaining significant effects mainly depends on the vehicle inner side, and when the vehicle outer side is configured in this manner, the effect of improving ride comfort tends to be difficult to obtain. Thus, on the vehicle inner side, by making the radius of curvature RPin of the carcass layer small with respect to the radius of curvature ROin of the tire external contour, a significant effect of enhancing run-flat durability performance and ride comfort can be obtained.

Additionally, in a pneumatic tire according to an embodiment of the present technology, the radius of curvature ROout and the radius of curvature RPout on the vehicle outer side have a relationship satisfying ROout×1.2≤RPout≤ROout×2.5.

When, in the vehicle outer side, the radius of curvature RPout of the carcass layer is less than 1.2 times the radius of curvature ROout of the tire external contour, the effect of enhancing run-flat durability performance due to an increase in vertical stiffness is small. When, on the vehicle outer side, the radius of curvature RPout of the carcass layer is greater than 2.5 times the radius of curvature ROout of the tire external contour, the increase in vertical stiffness is excessive and rolling resistance tends to increase. Accordingly, by satisfying the relationship ROout×1.2≤RPout≤ROout×2.5 of the radii of curvature ROout, RPout, a significant effect of enhancing the run-flat durability performance and a significant effect of suppressing an increase in rolling resistance can be obtained.

Additionally, in a pneumatic tire according to an embodiment of the present technology, the radius of curvature ROin and the radius of curvature RPin on the vehicle inner side have a relationship satisfying ROin×0.4≤RPin≤ROin×0.9.

When, on the vehicle inner side, the radius of curvature RPin of the carcass layer is less than 0.4 times the radius of curvature ROin of the tire external contour, the vertical stiffness significantly decreases and thus the run-flat durability performance is not significantly retained. When, on the vehicle inner side, the radius of curvature RPin of the carcass layer is greater than 0.9 times the radius of curvature ROin of the tire external contour, the decrease in vertical stiffness is insignificant and thus improvements in the ride comfort are insignificant. Accordingly, on the vehicle inner side, by satisfying the relationship ROin×0.4≤RPin≤ROin× 0.9 of the radii of curvature ROin, RPin, run-flat durability performance and ride comfort can be significantly enhanced.

Additionally, in a pneumatic tire according to an embodiment of the present technology, the radius of curvature RPout and the radius of curvature RPin of the carcass layer on the vehicle outer side and the vehicle inner side have a relationship satisfying RPin×2.0≤RPout≤RPin×5.0.

When, the radius of curvature RPout of the carcass layer on the vehicle outer side is less than two times the radius of curvature RPin of the carcass layer on the vehicle inner side, the difference in the vertical stiffness of the carcass layer between the vehicle outer side and the vehicle inner side is small and a tendency for vertical stiffness to increase on the vehicle outer side is decreased, thus the effect of enhancing steering stability performance is reduced, and a tendency for vertical stiffness to decrease on the vehicle inner side is reduced, thus the effect of enhancing ride comfort is reduced. When, the radius of curvature RPout of the carcass layer on the vehicle outer side is greater than five times the radius of curvature RPin of the carcass layer on the vehicle inner side, the difference in the vertical stiffness of the carcass layer between the vehicle outer side and the vehicle inner side is large and a tendency for vertical stiffness to increase on the vehicle outer side is great, thus creating a tendency to increase rolling resistance, and a tendency for vertical stiffness to decrease on the vehicle inner side is great, thus the effect of enhancing run-flat durability performance is reduced. Accordingly, by satisfying the relationship RPin×2.0≤RPout≤RPin×5.0 of the radii of curvature RPout, RPin of the carcass layer, run-flat durability performance, steering stability performance, and ride comfort can be significantly enhanced without the rolling resistance being degraded.

Additionally, in a pneumatic tire according to an embodiment of the present technology, the radius of curvature RPout on the vehicle outer side ranges from 70 mm to 150 mm.

When the radius of curvature RPout of the carcass layer on the vehicle outer side is less than 70 mm, the improvements in the run-flat durability performance due to an increase in vertical stiffness are insignificant. When the radius of curvature RPout of the carcass layer on the vehicle outer side is greater than 150 mm, the increase in vertical stiffness is excessive and rolling resistance tends to increase. Accordingly, by the radius of curvature RPout of the carcass layer on the vehicle outer side ranging from 70 mm to 150 mm, improvements in the run-flat durability performance can be significant and increases in rolling resistance can be significantly prevented.

Additionally, in a pneumatic tire according to an embodiment of the present technology, the radius of curvature RPin on the vehicle inner side ranges from 30 mm to 65 mm.

When the radius of curvature RPin of the carcass layer on the vehicle inner side is less than 30 mm, the decrease in vertical stiffness is significant and thus the run-flat durability performance is not significantly retained. When the radius of curvature RPin of the carcass layer on the vehicle inner side is greater than 65 mm, the decrease in the vertical stiffness is insignificant and thus improvements in the ride comfort are insignificant. Accordingly, by the radius of curvature RPin of the carcass layer on the vehicle inner side ranging from 30 mm to 65 mm, both good run-flat durability performance and ride comfort can be significantly achieved.

Additionally, in a pneumatic tire according to an embodiment of the present technology, for a total cross-sectional width in a meridian cross-section of the sidewall portions at the tire maximum width portion, a total cross-sectional width on the vehicle inner side is greater than a total cross-sectional width on the vehicle outer side.

According to this pneumatic tire, by the total cross-sectional width on the vehicle inner side being greater than the total cross-sectional width on the vehicle outer side, the rigidity lost on the vehicle inner side by the decrease in vertical stiffness can be made up for by the total cross-sectional width, and run-flat durability performance can be effectively improved on the vehicle outer side and the vehicle inner side.

Additionally, in a pneumatic tire according to an embodiment of the present technology, for a total cross-sectional width in a meridian cross-section of the sidewall portions at the tire maximum width portion, a total cross-sectional width on the vehicle inner side is greater by 1.0 mm to 5.0 mm than a total cross-sectional width on the vehicle outer side.

According to this pneumatic tire, by the total cross-sectional width on the vehicle inner side being greater than the total cross-sectional width on the vehicle outer side, the rigidity lost on the vehicle inner side by the decrease in vertical stiffness can be made up for by the total cross-sectional width, and run-flat durability performance can be effectively improved on the vehicle outer side and the vehicle inner side. In a configuration in which the total cross-sectional width on the vehicle inner side is greater by less than 1.0 mm than the total cross-sectional width on the vehicle outer side, the effect of making up for the rigidity lost on the vehicle inner side by the decrease in vertical stiffness with the total cross-sectional width tends to decrease, and it is difficult to effectively improve run-flat durability performance on the vehicle outer side and the vehicle inner side. In a configuration in which the total cross-sectional width on the vehicle inner side is greater by more than 5.0 mm than the total cross-sectional width on the vehicle outer side, the effect of making up for the rigidity lost on the vehicle inner side by the decrease in vertical stiffness with the total cross-sectional width is excessive, and rolling resistance may increase. Thus, by the total cross-sectional width on the vehicle inner side being greater by 1.0 mm to 5.0 mm than the total cross-sectional width on the vehicle outer side, run-flat durability performance can be effectively and significantly improved without degrading rolling resistance on the vehicle outer side and the vehicle inner side.

Additionally, in a pneumatic tire according to an embodiment of the present technology, for a total cross-sectional width in a meridian cross-section of the sidewall portions at the tire maximum width portion, a total cross-sectional width on the vehicle inner side ranges from 12 mm to 20 mm.

By the total cross-sectional width on the vehicle inner side being greater than the total cross-sectional width on the vehicle outer side, the rigidity lost on the vehicle inner side by the decrease in vertical stiffness can be made up for by the total cross-sectional width, and run-flat durability performance can be effectively improved on the vehicle outer side and the vehicle inner side. When the total cross-sectional width on the vehicle inner side is less than 12 mm, the rigidity tends to decrease, and it is difficult to effectively improve run-flat durability performance on the vehicle outer side and the vehicle inner side. When the total cross-sectional width on the vehicle inner side is greater than 20 mm, the rigidity tends to be excessive, and rolling resistance may increase. Thus, by the total cross-sectional width on the vehicle inner side being from 12 mm to 20 mm, run-flat durability performance can be effectively and significantly improved without degrading rolling resistance on the vehicle outer side and the vehicle inner side.

Additionally, in a pneumatic tire according to an embodiment of the present technology, carcass cords of the carcass layer are made from rayon.

According to the pneumatic tire, by using rayon, which is a fiber that is relatively light weight and has relatively high tensile strength, for the carcass cords of the carcass layer, the tensile strength in the tire radial direction of the carcass layer enables improvements in the run-flat durability performance to be significantly obtained.

A pneumatic tire according to an embodiment of the present technology can provide enhanced run-flat durability performance, steering stability performance, and ride comfort without the rolling resistance being degraded.

BRIEF DESCRIPTION OF DRAWINGS

FIG. 4 is a table showing the results of performance tests of pneumatic tires according to examples of the present technology.

DETAILED DESCRIPTION

Embodiments of the present technology are described in detail below based on the drawings. However, the present technology is not limited to these embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
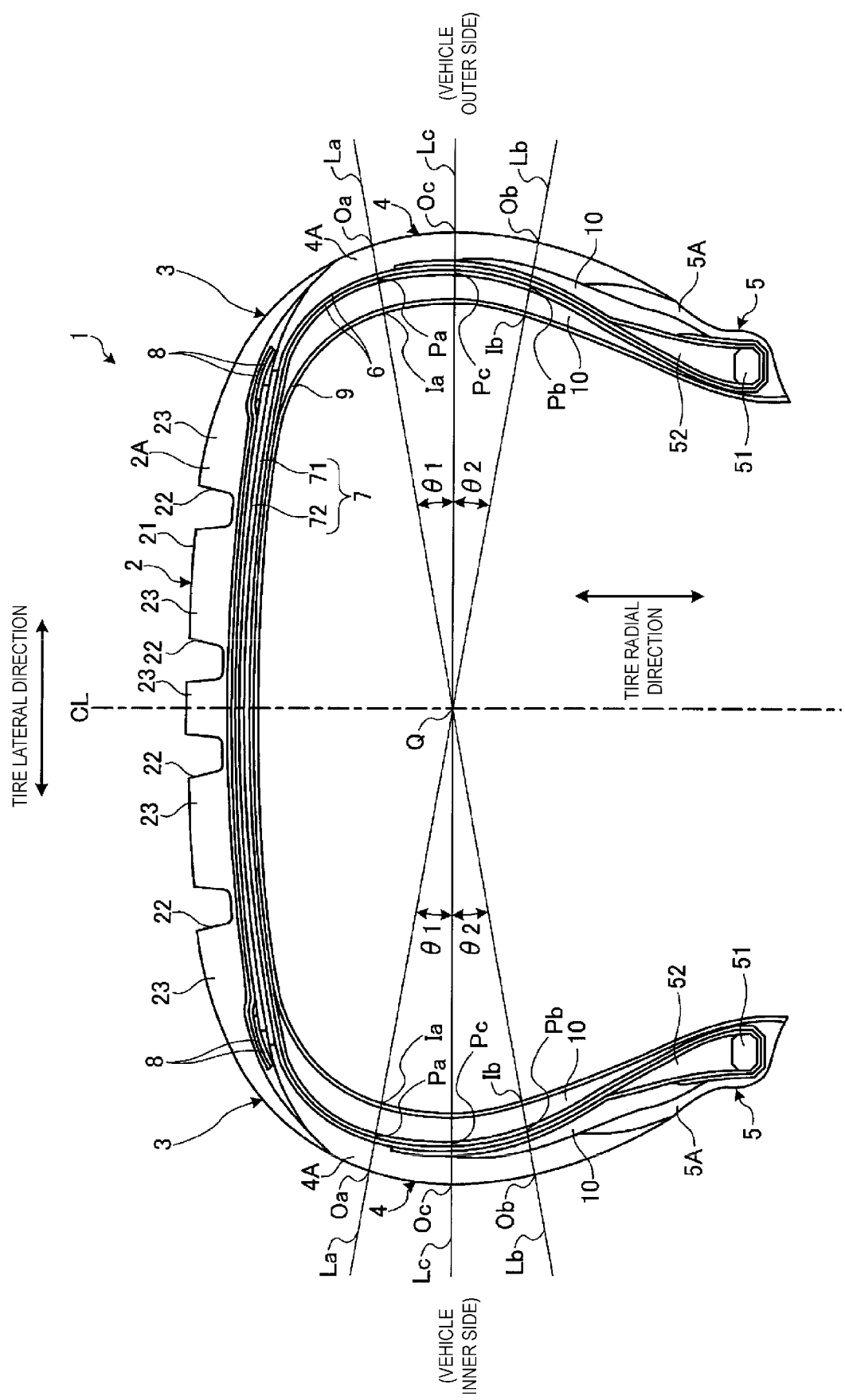
FIG. 1 is a meridian cross-sectional view of a pneumatic tire according to an embodiment of the present technology.
Figure 2:
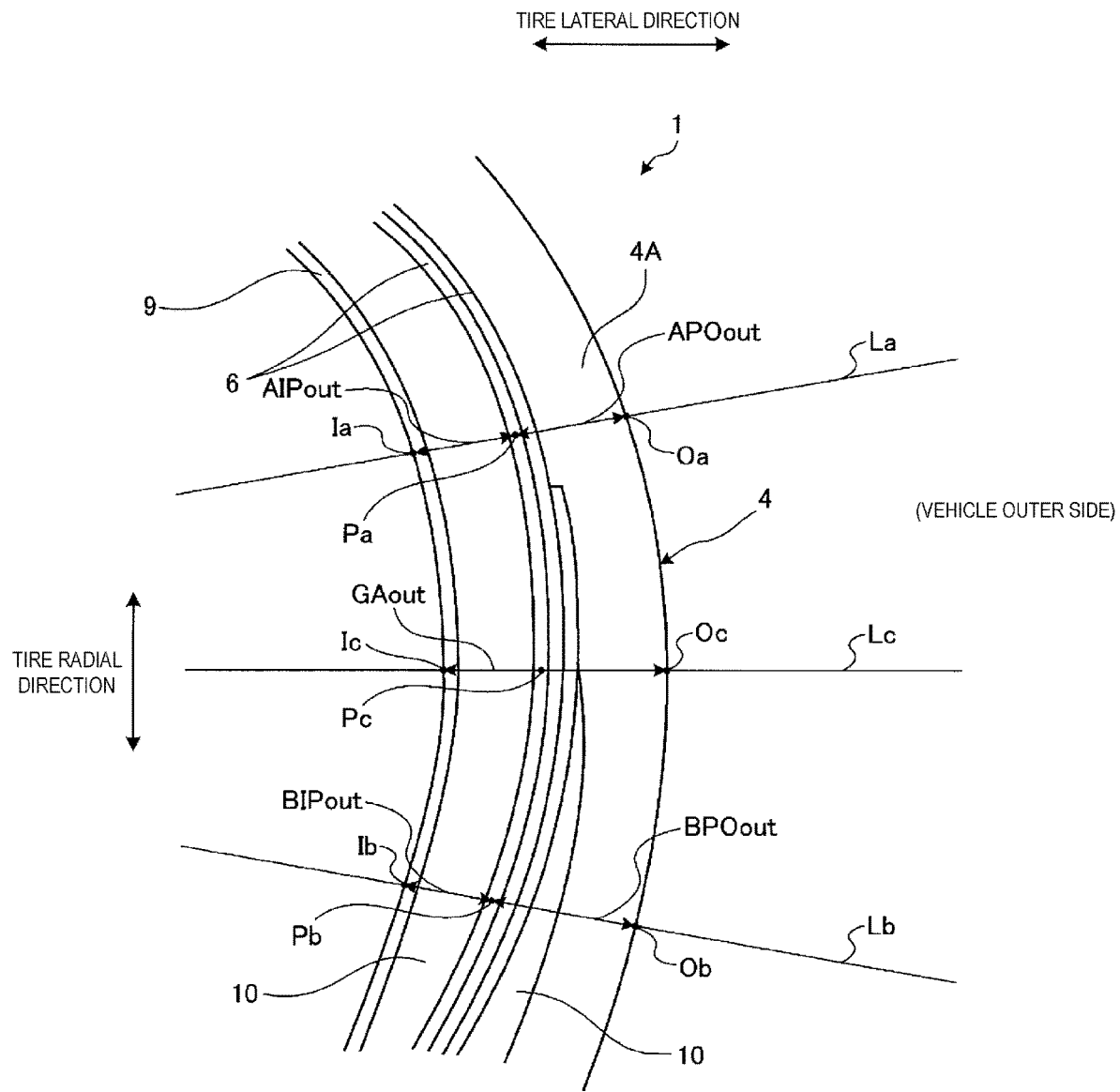
FIG. 2 is an enlarged meridian cross-sectional view of a portion of a pneumatic tire according to an embodiment of the present technology.
Figure 3:
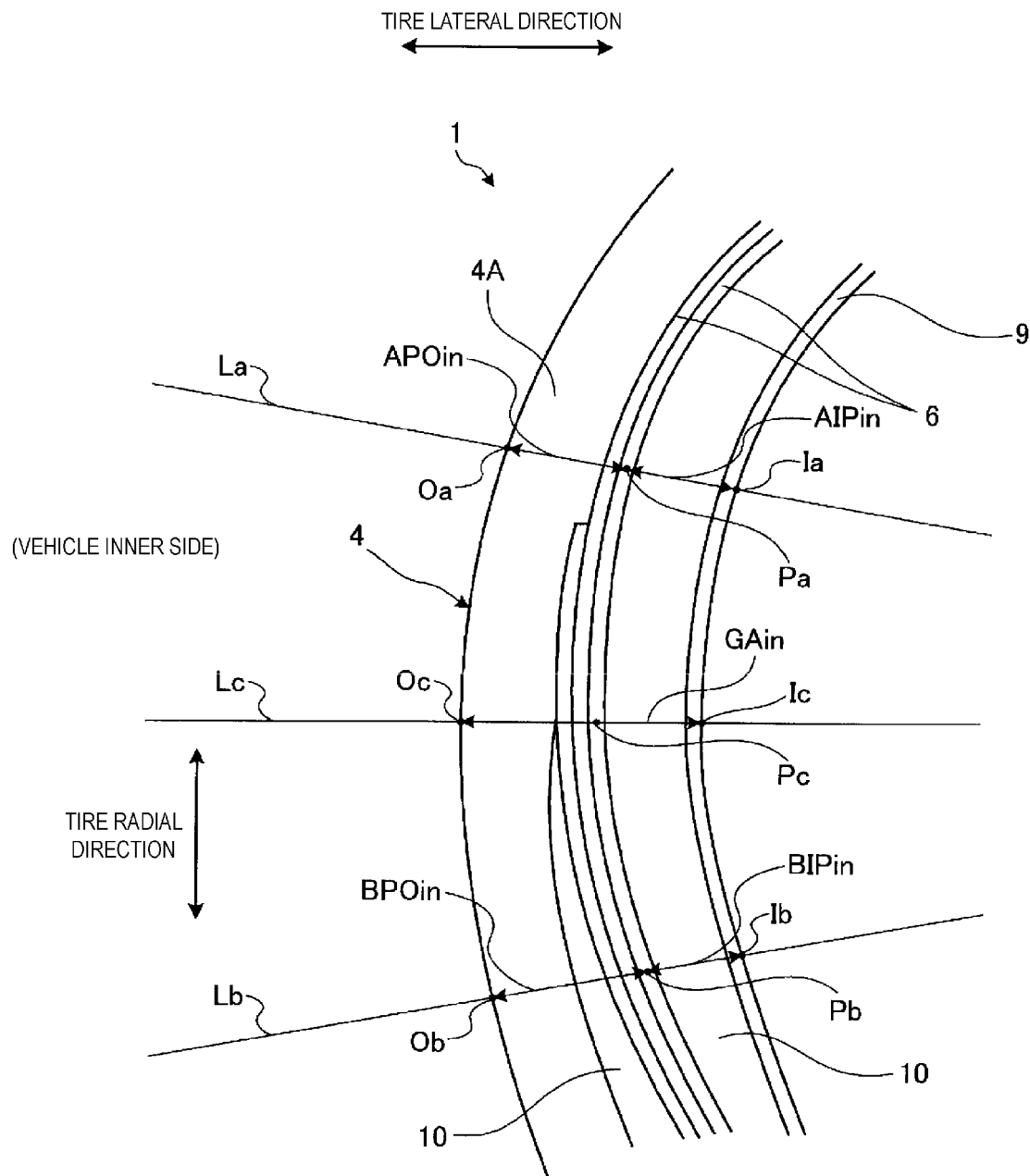
FIG. 3 is an enlarged meridian cross-sectional view of a portion of a pneumatic tire according to an embodiment of the present technology.

FIG. 1 is a meridian cross-sectional view of a pneumatic tire according to the present embodiment. FIGS. 2 and 3 are enlarged meridian cross-sectional views of a portion of the pneumatic tire according to the present embodiment.

Herein, "tire radial direction" refers to a direction orthogonal to the rotation axis (not illustrated) of a pneumatic tire 1. "Inward in the tire radial direction" refers to a side approximate to the rotation axis in the tire radial direction, and "outward in the tire radial direction" refers to the side distanced from the rotation axis in the tire radial direction. "Tire circumferential direction" refers to the circumferential direction with the rotation axis as the center axis. "Tire lateral direction" refers to the direction parallel with the rotation axis. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. "Tire equatorial plane CL" refers to the plane which is orthogonal to the rotation axis of the pneumatic tire 1 and passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction. "Tire equator line" refers to the line which is along the tire circumferential direction of the pneumatic tire 1 and lies on the tire equatorial plane CL. In the present embodiment, the tire equator line and the tire equatorial plane are both denoted by reference sign CL.

As illustrated in FIG. 1, the pneumatic tire 1 of the present embodiment includes a tread portion 2, shoulder portions 3 on both sides of the tread portion 2, and sidewall portions 4 and bead portions 5 continuing in that order from the shoulder portions 3. The pneumatic tire 1 also includes a carcass layer 6, a belt layer 7, a belt reinforcing layer 8, an innerliner layer 9, and a reinforcing rubber layer 10.

The tread portion 2 is made of tread rubber 2A, is exposed on the outermost side of the pneumatic tire 1 in the tire radial direction, and the surface thereof constitutes the contour of the pneumatic tire 1. A tread surface 21 is formed on the outer circumferential surface of the tread portion 2, in other words, on the road contact surface that comes in contact with the road surface when running. The tread surface 21 is provided with a plurality (four in the present embodiment) of main grooves 22 that are straight main grooves extending in the tire circumferential direction and parallel with the tire equator line CL. Moreover, a plurality of rib-like land portions 23 that extend in the tire circumferential direction are formed in the tread surface 21, defined by the plurality of main grooves 22. Note that the main grooves 22 may extend in the tire circumferential direction in a bending or curving manner. Additionally, lug grooves that extend in a direction that intersects the tire circumferential direction are provided in the land portions 23 of the tread surface 21. The lug grooves may intersect the main grooves 22. Alternatively, the lug grooves may have at least one end that does not intersect the main grooves 22 and terminates within a land portion 23. In the case of the lug grooves having both ends intersect the main grooves 22, the land portions 23 are formed into a plurality of block-like land portions divided in the tire circumferential direction. Note that the lug grooves may extend inclined with respect to the tire circumferential direction in a bending or curving manner.

The shoulder portions 3 are portions located outward in the tire lateral direction on both sides of the tread portion 2. In other words, the shoulder portions 3 are made of the tread rubber 2A. Additionally, the sidewall portions 4 are exposed on the outermost sides of the pneumatic tire 1 in the tire lateral direction. The sidewall portions 4 are each made of a side rubber 4A. The bead portions 5 each include a bead core 51 and a bead filler 52. The bead core 51 is formed by a bead wire, which is a steel wire, wound into an annular shape. The bead filler 52 is a rubber material that is disposed in the space formed by an end of the carcass layer 6 in the tire lateral direction folded back at the position of the bead core 51. The bead portions 5 each include an outwardly exposed rim cushion rubber 5A that comes into contact with the rim (not illustrated). The rim cushion rubber 5A constitutes the outer periphery of the bead portion 5. The rim cushion rubber 5A extends from the tire inner side of the bead portion 5 around the lower end portion thereof to a position (sidewall portion 4) covering the bead filler 52 on the tire outer side.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is constituted by a plurality of coating-rubber-covered carcass cords (not illustrated) disposed in the tire circumferential direction, parallel with each other, along a tire meridian direction at a given angle with respect to the tire circumferential direction. The carcass cords are made of organic fibers (for example, polyester, rayon, and nylon). At least one carcass layer 6 is provided, and in the present embodiment, two carcass layers 6 are provided. As illustrated in FIG. 1, the end portion of the inner layer of the two carcass layers 6 extends to the sidewall portion 4 covering all of the bead filler 52, whereas the end portion of the outer layer extends to a position at which the bead filler 52 is only partially covered.

The belt layer 7 has a multilayer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71 and 72 each include a plurality of coating-rubber-covered cords (not illustrated) disposed in alignment at a predetermined angle with respect to the tire circumferential direction (e.g., from 20° to 30°). The cords are made of steel or organic fibers (for example, polyester, rayon, and nylon). Moreover, the belts 71 and 72 overlap each other and are disposed so that the direction of the cords of the respective belts intersect each other.

The belt reinforcing layer 8 is disposed outward of the belt layer 7 in the tire radial direction, i.e. on the outer circumference thereof, and covers the belt layer 7 in the tire circumferential direction. The belt reinforcing layer 8 includes a plurality of coating-rubber-covered cords (not illustrated) disposed parallel in the tire lateral direction and substantially parallel (±5°) to the tire circumferential direction. The cords are made of steel or organic fibers (for example, polyester, rayon, and nylon). The belt reinforcing layer 8 illustrated in FIG. 1 includes one layer covering all of the belt layer 7 and one layer covering the end portions of the belt layer 7 in the tire lateral direction. The configuration of the belt reinforcing layer 8 is not limited to that described above. While not illustrated in the drawings, a configuration may be used in which, for example, the two layers are disposed covering all of the belt layer 7, or the two layers are disposed covering only the end portions of the belt layer 7 in the tire lateral direction. In addition, while not illustrated in the drawings, a configuration of the belt reinforcing layer 8 may be used in which, for example, one layer is disposed covering all of the belt layer 7, or one layer is disposed covering only the end portions of the belt layer 7 in the tire lateral direction. In other words, the belt reinforcing layer 8 overlaps with at least the end portions of the belt layer 7 in the tire lateral direction. Additionally, the belt reinforcing layer 8 is constituted of a band-like strip material (having, for example, a width of 10 mm) wound in the tire circumferential direction.

The innerliner layer 9 is the tire inner surface, i.e. the inner circumferential surface of the carcass layer 6, and reaches the bead cores 51 of the pair of bead portions 5 at both end portions in the tire lateral direction and extends in the tire circumferential direction in a toroidal shape. The innerliner layer 9 prevents air molecules from escaping from the tire. Note that, as illustrated in FIG. 1, the innerliner layer 9 may be disposed extending inward of the bead portion 5. However, the innerliner layer 9 may be disposed extending to the lower portion (inward in the tire radial direction) of the bead core 51.

The reinforcing rubber layer 10 is disposed within the sidewall portion 4 not inwardly or outwardly exposed. The reinforcing rubber layer 10 is mainly provided between the carcass layer 6 and the innerliner layer 9 corresponding to the inner side of the carcass layer 6, and has a crescent shaped meridian cross-section. The reinforcing rubber layer 10 is formed of rubber material that has a strength greater than that of the side rubber 4A of the sidewall portions 4 or that of the rim cushion rubber 5A of the bead portions 5. The reinforcing rubber layer 10 may be formed of differing rubber material and may be disposed between the carcass layer 6 and the side rubber 4A and rim cushion rubber 5A corresponding to the tire outer side of the carcass layer 6 as illustrated in FIG. 1.

Further, the pneumatic tire 1 of the present embodiment has a designated vehicle inner/outer orientation for when the tire is mounted on a vehicle. The designated orientation vehicle inner/outer side orientation for when the tire is mounted on a vehicle, while not illustrated in the drawings, for example, can be indicated via an indicator provided on the sidewall portion 4. The side facing the inner side of the vehicle when mounted on the vehicle is a "vehicle inner side" and a side facing the outer side of the vehicle is a "vehicle outer side". Note that the designations of the vehicle inner side and the vehicle outer side are not limited to cases where the tire is mounted on a vehicle. For example, in cases when the tire is mounted on a rim, orientation of the rim with respect to the inner side and the outer side of the vehicle in the tire lateral direction is predetermined. Accordingly, in the pneumatic tire 1, when mounted on a rim, the orientation with respect to the vehicle inner side and the vehicle outer side in the tire lateral direction is designated.

The pneumatic tire 1 is mounted on a vehicle (not illustrated) with the bead portions 5 assembled on the rim and inflated to a predetermined air pressure. When the vehicle travels, the tread surface 21 comes into contact with the road surface while the pneumatic tire 1 rotates. When the vehicle is travelling, because the tread surface 21 comes into contact with the road surface as described above, a load including the weight of the vehicle is borne by the tread surface 21. In the case of the tread surface 21 bearing such a load, the pneumatic tire 1 elastically deforms in a manner governed by the nature of the load and hardness of the parts of the tire, and the air the tire is inflated with acts on the inside of the tire to expand the tire in the outward direction. This biasing force due to the air the tire is inflated with prevents excessive deformation of the pneumatic tire 1, even when the tread surface 21 bears a load. Accordingly, the pneumatic tire 1 can rotate while bearing a load, thus allowing the vehicle to travel.

Though the pneumatic tire 1 does not readily deform due to the air pressure of the air the tire is inflated with, while the vehicle is traveling, a foreign material may pierce the tread surface 21 and cause a puncture, for example, thus causing air from inside the pneumatic tire 1 to escape. When air from inside the pneumatic tire 1 escapes, the biasing force due to the air acting on the inside of the pneumatic tire 1 to expand the pneumatic tire 1 outward decreases in strength. When a load is borne by the tread surface 21 of the deflated pneumatic tire 1, the tire-radial-direction load is borne by the sidewall portions 4. As a result, the sidewall portions 4 are susceptible to elastic deformation in the tire radial direction. However, these sidewall portions 4 are provided with the reinforcing rubber layers 10. As described above, the reinforcing rubber layer 10 is formed of rubber material with a strength greater than that of the side rubber 4A of the sidewall portions 4. Accordingly, the reinforcing rubber layer 10 suppresses deformation of the sidewall portions 4 in the tire radial direction even when the sidewall portions 4 bear a tire-radial-direction load. As a result, the pneumatic tire 1, by virtue of the reinforcing rubber layer 10 suppressing deformation of the sidewall portions 4 in the tire radial direction, enables travel of the vehicle or run-flat travel (travel with the pneumatic tire 1 in a deflated state).

When such a pneumatic tire 1 capable of run-flat travel is mounted on a regular rim, has an internal pressure of 0 kPa, and is in an unloaded state, a straight line orthogonal to the tire equatorial plane CL at the portion of the tire with the maximum width when viewed in a meridian cross-section is taken as straight line Lc. Additionally, a straight line from an intersection Q of the straight line Lc and the tire equatorial plane CL inclined outward in the tire radial direction by an angle $\theta 1$ of 10° with respect to the straight line Lc is taken as straight line La, and a straight line inclined inward in the tire radial direction by an angle $\theta 2$ of 10° is taken as straight line Lb. Here, a radius of curvature RO of the arc-like tire external contour that joins intersections Oa, Ob, Oc of the respective straight lines La, Lb, Lc with the tire external contour and a radius of curvature RP of the arc-like carcass layer 6 that joins intersections Pa, Pb, Pc of the respective straight lines La, Lb, Lc with the carcass layer 6 have a relationship set as follows. In other words, on the vehicle outer side, the radius of curvature RPout of the carcass layer 6 is large with respect to the radius of curvature ROout of the tire external contour, and on the vehicle inner side, the radius of curvature RPin of the carcass layer 6 is small with respect to the radius of curvature ROin of the tire external contour.

The intersections Pa, Pb, Pc are points where the center of the carcass cords of the most inwardly disposed carcass layer 6 and the respective straight lines La, Lb, Lc intersect.

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

"Tire maximum width portion" refers to the ends of the tire cross-sectional width S where the width in the tire lateral direction is the greatest. "Tire cross-sectional width" in the present embodiment is the maximum total tire width in the tire lateral direction, excluding any patterns or alphanumerics, when the pneumatic tire 1 is mounted on a regular rim, inflated to an internal pressure of 0 kPa, and is in an unloaded state. In tires provided with a rim protection bar (provided in the tire circumferential direction and projecting outward in the tire lateral direction) that protects the rim, the rim protection bar is the outermost portion in the tire lateral direction, but the cross-sectional width as defined in the present embodiment excludes the rim protection bar. In addition, "tire external contour" refers to the profile of the pneumatic tire 1, excluding any patterns or alphanumerics, conforming to the outer surface of the pneumatic tire 1. "Tire internal contour" refers to the profile conforming to the innerliner layer 9, which is the inner surface of the pneumatic tire 1.

When the radius of curvature RP of the carcass layer 6 is greater than the radius of curvature RO of the tire external contour, tensile strength in the tire radial direction of the carcass layer 6 tends to increase and vertical stiffness, i.e. elasticity in the tire radial direction, increases. As a result, both good run-flat durability performance and steering stability performance can be obtained without increasing the cross-sectional thickness of the reinforcing rubber layer 10, which contributes to enabling run-flat travel. Moreover, by removing the need to increase the cross-sectional thickness of the reinforcing rubber layer 10, which contributes to enabling run-flat travel, degradation in the rolling resistance can be suppressed. As a result, run-flat durability performance and steering stability performance can be enhanced without the rolling resistance being degraded. However, obtaining significant effects mainly depends on the vehicle outer side, and when the vehicle inner side is configured in this manner, the effect of improving steering stability performance tends to be difficult to obtain. Thus, on the vehicle outer side, by making the radius of curvature RPout of the carcass layer 6 large with respect to the radius of curvature ROout of the tire external contour, a significant effect of enhancing run-flat durability performance and steering stability performance can be obtained.

When the radius of curvature RP of the carcass layer 6 is smaller than the radius of curvature RO of the tire external contour, tensile strength in the tire radial direction of the carcass layer 6 tends to decrease and vertical stiffness, i.e. elasticity in the tire radial direction, decreases. As a result, ride comfort can be improved while retaining good run-flat traveling without decreasing the cross-sectional thickness of the reinforcing rubber layer 10, which contributes to enabling run-flat travel. As a result, good run-flat durability performance and ride comfort can be achieved in a compatible manner. However, obtaining significant effects mainly depends on the vehicle inner side, and when the vehicle outer side is configured in this manner, the effect of improving ride comfort tends to be difficult to obtain. Thus, on the vehicle inner side, by making the radius of curvature RPin of the carcass layer 6 small with respect to the radius of curvature ROin of the tire external contour, a significant effect of enhancing run-flat durability performance and ride comfort can be obtained.

In the pneumatic tire 1 of the present embodiment, the radii of curvature ROout, RPout on the vehicle outer side satisfy the relationship ROout×1.2≤RPout≤ROout×2.5, which is preferable.

When, on the vehicle outer side, the radius of curvature RPout of the carcass layer 6 is less than 1.2 times the radius of curvature ROout of the tire external contour, the effect of enhancing run-flat durability performance due to an increase in vertical stiffness is small. When, on the vehicle outer side, the radius of curvature RPout of the carcass layer 6 is greater than 2.5 times the radius of curvature ROout of the tire external contour, the increase in vertical stiffness is excessive and rolling resistance tends to increase. Accordingly, by satisfying the relationship ROout×1.2≤RPout≤ROout×2.5 of the radii of curvature ROout, RPout, a significant effect of enhancing the run-flat durability performance and a significant effect of suppressing an increase in rolling resistance can be obtained. Note that to improve the run-flat durability performance and prevent increases in rolling resistance more significantly, satisfying the relationship ROout×1.5≤RPout≤ROout×2.0 is more preferable.

In the pneumatic tire 1 of the present embodiment, on the vehicle inner side, the radii of curvature ROin, RPin preferably satisfy the relationship ROin×0.4≤RPin≤ROin×0.9.

When, on the vehicle inner side, the radius of curvature RPin of the carcass layer 6 is less than 0.4 times the radius of curvature ROin of the tire external contour, the vertical stiffness significantly decreases and thus the run-flat durability performance is not significantly retained. When, on the vehicle inner side, the radius of curvature RPin of the carcass layer 6 is greater than 0.9 times the radius of curvature ROin of the tire external contour, the decrease in vertical stiffness is insignificant and thus improvements in the ride comfort are insignificant. Accordingly, on the vehicle inner side, by satisfying the relationship ROin×0.4≤RPin≤ROin×0.9 of the radii of curvature ROin, RPin, run-flat durability performance and ride comfort can be significantly enhanced. Note that to enhance run-flat durability performance and ride comfort more significantly, satisfying the relationship ROin×0.5≤RPin≤ROin×0.8 is more preferable.

In the pneumatic tire 1 of the present embodiment, the radii of curvature RPout, RPin of the carcass layer 6 on the vehicle outer side and the vehicle inner side preferably satisfy the relationship RPin×2.0≤RPout≤RPin×5.0.

When, the radius of curvature RPout of the carcass layer 6 on the vehicle outer side is less than two times the radius of curvature RPin of the carcass layer 6 on the vehicle inner side, the difference in the vertical stiffness of the carcass layer 6 between the vehicle outer side and the vehicle inner side is small and a tendency for vertical stiffness to increase on the vehicle outer side is decreased, thus the effect of enhancing steering stability performance is reduced, and a tendency for vertical stiffness to decrease on the vehicle inner side is reduced, thus the effect of enhancing ride comfort is reduced. When, the radius of curvature RPout of the carcass layer 6 on the vehicle outer side is greater than five times the radius of curvature RPin of the carcass layer 6 on the vehicle inner side, the difference in the vertical stiffness of the carcass layer 6 between the vehicle outer side and the vehicle inner side is large and a tendency for vertical stiffness to increase on the vehicle outer side is great, thus creating a tendency to increase rolling resistance, and a tendency for vertical stiffness to decrease on the vehicle inner side is great, thus the effect of enhancing run-flat durability performance is reduced. Accordingly, by satisfying the relationship RPin×2.0≤RPout≤RPin×5.0 of the radii of curvature RPout, RPin of the carcass layer 6, run-flat durability performance, steering stability performance, and ride comfort can be significantly enhanced without the rolling resistance being degraded. Note that to more significantly enhance run-flat durability performance, steering stability performance, and ride comfort without the rolling resistance being degraded, satisfying the relationship RPin×3.0≤RPout≤RPin×4.0 is more preferable.

In the pneumatic tire 1 of the present embodiment, the radius of curvature RPout on the vehicle outer side is preferably from 70 mm to 150 mm.

When the radius of curvature RPout of the carcass layer 6 on the vehicle outer side is less than 70 mm, the improvements in the run-flat durability performance due to an increase in vertical stiffness are insignificant. When the radius of curvature RPout of the carcass layer 6 on the vehicle outer side is greater than 150 mm, the increase in vertical stiffness is excessive and rolling resistance tends to increase. Accordingly, by the radius of curvature RPout of the carcass layer 6 on the vehicle outer side ranging from 70 mm to 150 mm, improvements in the run-flat durability performance can be significant and increases in rolling resistance can be significantly prevented. Note that to improve the run-flat durability performance and prevent increases in rolling resistance more significantly, the radius of curvature RPout of the carcass layer 6 on the vehicle outer side is preferably from 90 mm to 130 mm.

In the pneumatic tire 1 of the present embodiment, the radius of curvature RPin of the carcass layer 6 on the vehicle inner side is preferably from 30 mm to 65 mm.

When the radius of curvature RPin of the carcass layer 6 on the vehicle inner side is less than 30 mm, the decrease in vertical stiffness is significant and thus the run-flat durability performance is not significantly retained. When the radius of curvature RPin of the carcass layer 6 on the vehicle inner side is greater than 65 mm, the decrease in the vertical stiffness is insignificant and thus improvements in the ride comfort are insignificant. Accordingly, by the radius of curvature RPin of the carcass layer 6 on the vehicle inner side ranging from 30 mm to 65 mm, both good run-flat durability performance and ride comfort can be significantly achieved. Note that to obtain good run-flat durability performance and ride comfort in a compatible manner more significantly, the radius of curvature RPin of the carcass layer 6 on the vehicle inner side more preferably ranges from 40 mm to 50 mm.

In the pneumatic tire 1 of the present embodiment, for the total cross-sectional width (dimension of intersection Oc-Ic of FIGS. 2 and 3) in a meridian cross-section of the sidewall portion 4 at the tire maximum width portion, a total cross-sectional width GAin on the vehicle inner side is preferably greater than a total cross-sectional width GAout on the vehicle outer side.

According to the pneumatic tire 1, by the total cross-sectional width GAin on the vehicle inner side being greater than the total cross-sectional width GAout on the vehicle outer side, the rigidity lost on the vehicle inner side by the decrease in vertical stiffness can be made up for by the total cross-sectional width, and run-flat durability performance can be effectively improved on the vehicle outer side and the vehicle inner side. Note that in a typical pneumatic tire capable of run-flat travelling, the reinforcing rubber layer 10 which contributes to run-flat travelling is made of rubber with low heat build-up compared to the surrounding side rubber 4A and rim cushion rubber 5A. As a result, in a configuration in which there is difference in the total cross-sectional width, setting of the cross-sectional width of the reinforcing rubber layer 10 suppresses the effects of heat build-up, which is preferable.

In the pneumatic tire 1 of the present embodiment, for the total cross-sectional width (dimension of intersection Oc-Ic of FIGS. 2 and 3) in a meridian cross-section of the sidewall portion 4 at the tire maximum width portion, a total cross-sectional width GAin on the vehicle inner side is preferably greater by 1.0 mm to 5.0 mm than a total cross-sectional width GAout on the vehicle outer side.

In a configuration in which the total cross-sectional width GAin on the vehicle inner side is greater by less than 1.0 mm than the total cross-sectional width GAout on the vehicle outer side, the effect of making up for the rigidity lost on the vehicle inner side by the decrease in vertical stiffness with the total cross-sectional width tends to decrease, and it is difficult to effectively improve run-flat durability performance on the vehicle outer side and the vehicle inner side. In a configuration in which the total cross-sectional width GAin on the vehicle inner side is greater by more than 5.0 mm than the total cross-sectional width GAout on the vehicle outer side, the effect of making up for the rigidity lost on the vehicle inner side by the decrease in vertical stiffness with the total cross-sectional width tends to be excessive, and rolling resistance may increase. Thus, by the total cross-sectional width GAin on the vehicle inner side being greater by 1.0 mm to 5.0 mm than the total cross-sectional width GAout on the vehicle outer side, run-flat durability performance can be effectively and significantly improved without degrading rolling resistance on the vehicle outer side and the vehicle inner side.

In the pneumatic tire 1 of the present embodiment, for the total cross-sectional width (dimension of intersection Oc-Ic of FIGS. 2 and 3) in a meridian cross-section of the sidewall portion 4 at the tire maximum width portion, a total cross-sectional width GAin on the vehicle inner side is preferably from 12 mm to 20 mm.

When the total cross-sectional width GAin on the vehicle inner side is less than 12 mm, the rigidity tends to decrease, and it is difficult to effectively improve run-flat durability performance on the vehicle outer side and the vehicle inner side. When the total cross-sectional width GAin on the vehicle inner side is greater than 20 mm, the rigidity tends to be excessive, and rolling resistance may increase. Thus, by the total cross-sectional width GAin on the vehicle inner side being from 12 mm to 20 mm, run-flat durability performance can be effectively and significantly improved without degrading rolling resistance on the vehicle outer side and the vehicle inner side.

Additionally, in the pneumatic tire 1 of the present embodiment, the material of the carcass cords of the carcass layer 6 is preferably rayon.

According to the pneumatic tire 1, by using rayon, which is a fiber that is relatively light weight and has relatively high tensile strength, for the carcass cords of the carcass layer 6, the tensile strength in the tire radial direction of the carcass layer 6 enables improvements in the run-flat durability performance to be significantly obtained.

In the pneumatic tire of the first embodiment, the following configuration is more preferable.

The pneumatic tire 1 of the present embodiment, on the vehicle outer side, is provided with the reinforcing rubber layer 10 within the cross-sectional width AIPout taken from the intersection Ia of the straight line La and the tire internal contour to the intersection Pa of the straight line La and the carcass layer 6. On the vehicle outer side, the cross-sectional width APOout is taken from the intersection Pa to the intersection Oa of the straight line La and the tire external contour. Here, the cross-sectional width AIPout and the cross-sectional width APOout preferably satisfy the relationship APOout<AIPout.

According to this pneumatic tire 1, by the cross-sectional width AIPout being greater than the cross-sectional width APOout, the volume of the reinforcing rubber layer 10 within the cross-sectional width AIPout becomes relatively large, thus enabling improvements in the run-flat durability performance to be more significantly obtained.

In the pneumatic tire 1 of the present embodiment, on the vehicle outer side, the cross-sectional widths AIPout, APOout preferably have the relationship APOout×1.5≤AIPout≤APOout×6.0, and the cross-sectional width AIPout is preferably from 5.0 mm to 12.0 mm.

In a case where the relationship APOout<AIPout is such that the cross-sectional width AIPout within which the reinforcing rubber layer 10 is disposed is less than 1.5 times the cross-sectional width APOout, improvements in the run-flat durability performance are insignificant. In a case where the cross-sectional width AIPout is greater than 6.0 times the cross-sectional width APOout, the increase in volume of the reinforcing rubber layer 10 is excessive and rolling resistance increases. In a case where the cross-sectional width AIPout is less than 5.0 mm, improvements in the run-flat durability performance are insignificant. In a case where the cross-sectional width AIPout is greater than 12.0 mm, the increase in volume of the reinforcing rubber layer 10 is excessive and rolling resistance increases. Accordingly, by the cross-sectional widths AIPout, APOout satisfying the relationship APOout×1.5≤AIPout≤APOout×6.0 and the cross-sectional width AIPout being from 5.0 mm to 12.0 mm, improvements in the run-flat durability performance can be significant and increases in rolling resistance can be significantly prevented. Note that to improve the run-flat durability performance and prevent increases in rolling resistance more significantly, satisfying the relationship APOout×3.0≤AIPout≤APOout×5.0 is more preferable and the cross-sectional width AIPout is preferably from 7.0 mm to 10.0 mm.

The pneumatic tire 1 of the present embodiment, on the vehicle outer side, is provided with the reinforcing rubber layer 10 within the cross-sectional width AIPout taken from the intersection Ia of the straight line La and the tire internal contour to the intersection Pa of the straight line La and the carcass layer 6. On the vehicle outer side, the cross-sectional width APOout is taken from the intersection Pa to the intersection Oa of the straight line La and the tire external contour. Here, the cross-sectional width AIPout and the cross-sectional width APOout preferably satisfy the relationship AIPout≤APOout.

According to this pneumatic tire 1, by the cross-sectional width AIPout being less than the cross-sectional width APOout, the volume of the reinforcing rubber layer 10 within the cross-sectional width AIPout becomes relatively small, thus enabling the rolling resistance to be decreased.

In the pneumatic tire 1 of the present embodiment, on the vehicle outer side, the cross-sectional widths AIPout, APOout preferably have the relationship APOout×0.5≤AIPout≤APOout×0.9, and the cross-sectional width AIPout is preferably from 3.0 mm to 9.0 mm.

In a case where the relationship AIPout≤APOout is such that the cross-sectional width AIPout within which the reinforcing rubber layer 10 is disposed is less than 0.5 times the cross-sectional width APOout, improvements in the run-flat durability performance are insignificant. In a case where the cross-sectional width AIPout is greater than 0.9 times the cross-sectional width APOout, the increase in volume of the reinforcing rubber layer 10 is excessive and rolling resistance increases. In a case where the cross-sectional width AIPout is less than 3.0 mm, improvements in the run-flat durability performance are insignificant. In a case where the cross-sectional width AIPout is greater than 9.0 mm, the increase in volume of the reinforcing rubber layer 10 is excessive and rolling resistance increases. Accordingly, by the cross-sectional widths AIPout, APOout having the relationship APOout×0.5≤AIPout≤APOout×0.9 and the cross-sectional width AIPout being from 3.0 mm to 9.0 mm, improvements in the run-flat durability performance can be significant and increases in rolling resistance can be significantly prevented.

The pneumatic tire 1 of the present embodiment, on the vehicle outer side, is provided with the reinforcing rubber layer 10 within the cross-sectional width AIPout taken from the intersection Ia of the straight line La and the tire internal contour to the intersection Pa of the straight line La and the carcass layer 6. On the vehicle outer side, the cross-sectional width APOout is taken from the intersection Pa to the intersection Oa of the straight line La and the tire external contour. On the vehicle outer side, the reinforcing rubber layer 10 is provided within a cross-sectional width BIPout taken from an intersection Ib of the straight line Lb and the tire internal contour to the intersection Pb of the straight line Lb and the carcass layer 6. On the vehicle outer side, the cross-sectional width BPOout is taken from the intersection Pb to the intersection Ob of the straight line Lb and the tire external contour. Here, the cross-sectional widths AIPout, APOout, BIPout, BPOout preferably satisfy the relationship BIPout/BPOout<AIPout/APOout≤BIPout/BPOout×5.0.

In a case where BIPout/BPOout is a greater value than AIPout/APOout, the volume of the reinforcing rubber layer 10 is decreased overall, thus improvements in the run-flat durability performance are insignificant. In a case where AIPout/APOout is more than 5.0 times greater than the value of BIPout/BPOout, the volume of the reinforcing rubber layer 10 on the outer side in the tire radial direction becomes relatively large and rigidity is excessive, thus increasing rolling resistance. Accordingly, by the cross-sectional widths AIPout, APOout, BIPout, BPOout having the relationship BIPout/BPOout<AIPout/APOout≤BIPout/BPOout×5.0, improvements in the run-flat durability performance can be significant and increases in rolling resistance can be significantly prevented.

The pneumatic tire 1 of the present embodiment, on the vehicle inner side, is provided with the reinforcing rubber layer 10 within the cross-sectional width AIPin taken from the intersection Ia of the straight line La and the tire internal contour to the intersection Pa of the straight line La and the carcass layer 6. on the vehicle inner side, the cross-sectional width APOin is taken from the intersection Pa to the intersection Oa of the straight line La and the tire external contour. Here, the cross-sectional width AIPin and the cross-sectional width APOin preferably satisfy the relationship APOin<AIPin.

According to this pneumatic tire 1, by the cross-sectional width AIPin being greater than the cross-sectional width APOin, the volume of the reinforcing rubber layer 10 within the cross-sectional width AIPin becomes relatively large, thus enabling improvements in the run-flat durability performance to be more significantly obtained.

In the pneumatic tire 1 of the present embodiment, on the vehicle inner side, the cross-sectional widths AIPin, APOin preferably have the relationship APOin×1.5≤AIPin≤APOin×6.0, and the cross-sectional width AIPin is preferably from 5.0 mm to 12.0 mm.

In a case where the relationship APOin<AIPin is such that the cross-sectional width AIPin within which the reinforcing rubber layer 10 is disposed is less than 1.5 times the cross-sectional width APOin, improvements in the run-flat durability performance are insignificant. In a case where the cross-sectional width AIPin is greater than 6.0 times the cross-sectional width APOin, the increase in volume of the reinforcing rubber layer 10 is excessive and rolling resistance increases. In a case where the cross-sectional width AIPin is less than 5.0 mm, improvements in the run-flat durability performance are insignificant. In a case where the cross-sectional width AIPin is greater than 12.0 mm, the increase in volume of the reinforcing rubber layer 10 is excessive and rolling resistance increases. Accordingly, by the cross-sectional widths AIPin, APOin having the relationship APOin×1.5≤AIPin≤APOin×6.0 and the cross-sectional width AIPin being from 5.0 mm to 12.0 mm, improvements in the run-flat durability performance can be significant and increases in rolling resistance can be significantly prevented. Note that to improve the run-flat durability performance and prevent increases in rolling resistance more significantly, satisfying the relationship APOin×3.0≤AIPin≤APOin×5.0 is more preferable and the cross-sectional width AIPin is preferably from 7.0 mm to 10.0 mm.

The pneumatic tire 1 of the present embodiment, on the vehicle inner side, is provided with the reinforcing rubber layer 10 within the cross-sectional width AIPin taken from the intersection Ia of the straight line La and the tire internal contour to the intersection Pa of the straight line La and the carcass layer 6. On the vehicle inner side, the cross-sectional width APOin is taken from the intersection Pa to the intersection Oa of the straight line La and the tire external contour. Here, the cross-sectional width AIPin and the cross-sectional width APOin preferably satisfy the relationship APOin<AIPin.

According to this pneumatic tire 1, by the cross-sectional width AIPin being less than the cross-sectional width APOin, the volume of the reinforcing rubber layer 10 within the cross-sectional width AIPin becomes relatively small, thus enabling the rolling resistance to be decreased.

In the pneumatic tire 1 of the present embodiment, on the vehicle inner side, the cross-sectional widths AIPin, APOin preferably have the relationship APOin×0.5≤AIPin≤APOin×0.9, and the cross-sectional width AIPin is preferably from 3.0 mm to 9.0 mm.

In a case where the relationship AIPin≤APOin is such that the cross-sectional width AIPin within which the reinforcing rubber layer 10 is disposed is less than 0.5 times the cross-sectional width APOin, improvements in the run-flat durability performance are insignificant. In a case where the cross-sectional width AIPin is greater than 0.9 times the cross-sectional width APOin, the increase in volume of the reinforcing rubber layer 10 is excessive and rolling resistance increases. In a case where the cross-sectional width AIPin is less than 3.0 mm, improvements in the run-flat durability performance are insignificant. In a case where the cross-sectional width AIPin is greater than 9.0 mm, the increase in volume of the reinforcing rubber layer 10 is excessive and rolling resistance increases. Accordingly, by the cross-sectional widths AIPin, APOin having the relationship APOin×0.5≤AIPin≤APOin×0.9 and the cross-sectional width AIPin being from 3.0 mm to 9.0 mm, improvements in the run-flat durability performance can be significant and increases in rolling resistance can be significantly prevented.

The pneumatic tire 1 of the present embodiment, on the vehicle inner side, is provided with the reinforcing rubber layer 10 within the cross-sectional width AIPin taken from the intersection Ia of the straight line La and the tire internal contour to the intersection Pa of the straight line La and the carcass layer 6. On the vehicle inner side, the cross-sectional width APOin is taken from the intersection Pa to the intersection Oa of the straight line La and the tire external contour. On the vehicle inner side, the reinforcing rubber layer 10 is provided within a cross-sectional width BIPin taken from an intersection Ib of the straight line Lb and the tire internal contour to the intersection Pb of the straight line Lb and the carcass layer 6. On the vehicle inner side, the cross-sectional width BPOin is taken from the intersection Pb to the intersection Ob of the straight line Lb and the tire external contour. Here, the cross-sectional widths AIPin, APOin, BIPin, BPOin preferably satisfy the relationship BIPin/BPOin<AIPin/APOin≤BIPin/BPOin×5.0.

In a case where BIPin/BPOin is a greater value than AIPin/APOin, the volume of the reinforcing rubber layer 10 is decreased overall, thus improvements in the run-flat durability performance are insignificant. In a case where AIPin/APOin is more than 5.0 times greater than the value of BIPin/BPOin, the volume of the reinforcing rubber layer 10 on the outer side in the tire radial direction becomes relatively large and rigidity is excessive, thus increasing rolling resistance. Accordingly, by the cross-sectional widths AIPin, APOin, BIPin, BPOin having the relationship BIPin/BPOin≤AIPin/APOin<BIPin/BPOin×5.0, improvements in the run-flat durability performance can be significant and increases in rolling resistance can be significantly prevented.

EXAMPLES

In the examples, performance tests for run-flat durability performance, steering stability performance, ride comfort, and rolling resistance reduction performance were performed on a plurality of types of pneumatic tires of different conditions (see FIG. 4).

In the tests, pneumatic tires (test tires) of tire size 235/50R18 mounted on regular rims of 18×7.5J were used.

The run-flat durability performance evaluation test was carried out on a test course in accordance with Economic Commission for Europe (ECE) Regulation 30, with the test tires having an internal pressure of 0 kPa. The results for distance traveled were expressed as index values and evaluated, with the results of Conventional Example being defined as the reference (100). Larger index values indicate more distance traveled and thus superior run-flat durability performance.

The steering stability performance evaluation test involved a sensory evaluation performed by an experienced driver on items including straight-running stability during forward motion, as well as turning stability, rigidity, and steering during lane changing and cornering, at speeds of from 60 km/h to 120 km/h on dry road surfaces, the test tires being inflated to the regular internal pressure (230 kPa) and mounted on the test vehicle (a 2000 cc sport utility vehicle (SUV) made in Japan). Based on the sensory evaluation, the results were expressed as index values and evaluated with the results of Conventional Example being defined as the reference (100). In this evaluation, larger index values indicate superior steering stability performance.

The ride comfort evaluation test involved a sensory evaluation performed by a test driver after a test vehicle (a 2000 cc sport utility vehicle (SUV) made in Japan) on which the test tires were mounted was driven on a test course. The test tires were inflated to the specified internal pressure (230 kPa). The results were expressed as index values and evaluated, with the results of Conventional Example being defined as the reference (100). Larger index values indicate superior ride comfort.

The rolling resistance reduction performance was carried out using an indoor drum testing machine to measure the resistance at a speed of 50 km/h of the test tires inflated to the regular internal pressure (230 kPa) and loaded with 4 kN. Then, the measurement results were expressed as index values with the value of Conventional Example being defined as the reference (100). In the evaluation, larger index values indicate less rolling resistance and thus superior rolling resistance reduction performance.

As shown in FIG. 4, the pneumatic tires of Conventional Example have the relationship of the radius of curvature ROout and the radius of curvature RPout and the relationship of the radius of curvature ROout and the radius of curvature RPout not as specified and in an equal relationship. Additionally, the pneumatic tires of Conventional Example have the relationship of the radius of curvature ROout and the radius of curvature RPout and the relationship of the radius of curvature ROout and the radius of curvature RPout specified opposite to those of the Examples. Additionally, the pneumatic tires of Examples 1 to 15 have the relationship of the radius of curvature ROout and the radius of curvature RPout and the relationship of the radius of curvature ROout and the radius of curvature RPout specified. Additionally, the pneumatic tires of Examples 2 to 15 have the other relationships specified.

As can be seen from the test results shown in FIG. 4, the pneumatic tires of Examples 1 to 15 provide enhanced run-flat durability performance, steering stability performance, and ride comfort without the rolling resistance being degraded.

The invention claimed is:

1. A pneumatic tire, comprising:
an indicator indicating a designated vehicle inner/outer side orientation for mounting the pneumatic tire on a vehicle;
a reinforcing rubber layer disposed in sidewall portions on both sides in a tire lateral direction, the reinforcing rubber layer having a substantially crescent shaped meridian cross-section; wherein
when the tire is mounted on a regular rim, has an internal pressure of 0 kPa, and is in an unloaded state,
a radius of curvature ROout with an arc joining intersections of first, second and third straight lines with a tire side profile on the vehicle outer side, and a radius of curvature RPout with an arc joining intersections of the first, second and third straight lines with a carcass layer on the vehicle outer side have a relationship such that, on the vehicle outer side, the radius of curvature RPout of the carcass layer is large with respect to the radius of curvature ROout of the tire side profile
a radius of curvature ROin with an arc joining intersections of first, second and third straight lines with a tire side profile on the vehicle inner side, and a radius of curvature RPin with an arc joining intersections of the first, second and third straight lines with the carcass layer on the vehicle inner side have a relationship such that, on the vehicle inner side, the radius of curvature RPin of the carcass layer is small with respect to a radius of curvature ROin of the tire side profile, where
the first straight lines on the vehicle inner side and on the vehicle outer side are straight lines orthogonal to a tire equatorial plane at a tire maximum width portion when viewed in a meridian cross section,
the second straight lines on the vehicle inner side and on the vehicle outer side are straight lines from an intersection of the first straight lines and the tire equatorial plane inclined by 10° outward in a tire radial direction with respect to the first straight lines,
the third straight lines on the vehicle inner side and on the vehicle outer side are straight lines from the intersection of the first straight lines and the tire equatorial plane inclined by 10° inward in the tire radial direction with respect to the first straight lines, and
the tire side profiles on the vehicle inner side and on the vehicle outer side are defined as arcs smoothly formed by connecting a bead profile and a shoulder profile of the pneumatic tire and excluding any protection bars, patterns or letters provided on outer surfaces of the pneumatic tire.

2. The pneumatic tire according to claim 1, wherein the radius of curvature ROout and the radius of curvature RPout on the vehicle outer side have a relationship satisfying ROout×1.2<RPout<ROout×2.5.

3. The pneumatic tire according to claim 1, wherein the radius of curvature ROin and the radius of curvature RPin on the vehicle inner side have a relationship satisfying ROin×0.4<RPin<ROin×0.9.

4. The pneumatic tire according to claim 1, wherein the radius of curvature RPout and the radius of curvature RPin of the carcass layer on the vehicle outer side and the vehicle inner side have a relationship satisfying RPin×2.0<RPout<RPin×5.0.

5. The pneumatic tire according to claim 1, wherein the radius of curvature RPout on the vehicle outer side ranges from 70 mm to 150 mm.

6. The pneumatic tire according to claim 1, wherein the radius of curvature RPin on the vehicle inner side ranges from 30 mm to 65 mm.

7. The pneumatic tire according to claim 1, wherein for a total cross-sectional width in a meridian cross-section of the sidewall portions at the tire maximum width portion, a total cross-sectional width on the vehicle inner side is greater than a total cross-sectional width on the vehicle outer side.

8. The pneumatic tire according to claim 1, wherein for a total cross-sectional width in a meridian cross-section of the sidewall portions at the tire maximum width portion, a total cross-sectional width on the vehicle inner side is greater by 1.0 mm to 5.0 mm than a total cross-sectional width on the vehicle outer side.

9. The pneumatic tire according to claim 7, wherein for a total cross-sectional width in a meridian cross-section of the sidewall portions at the tire maximum width portion, a total cross-sectional width on the vehicle inner side ranges from 12 mm to 20 mm.

10. The pneumatic tire according to claim 1, wherein carcass cords of the carcass layer are made from rayon.

11. The pneumatic tire according to claim 2, wherein the radius of curvature ROin and the radius of curvature RPin on the vehicle inner side have a relationship satisfying ROin×0.4<RPin<ROin×0.9.

12. The pneumatic tire according to claim 11, wherein the radius of curvature RPout and the radius of curvature RPin of the carcass layer on the vehicle outer side and the vehicle inner side have a relationship satisfying RPin×2.0<RPout<RPin×5.0.

13. The pneumatic tire according to claim 12, wherein the radius of curvature RPout on the vehicle outer side ranges from 70 mm to 150 mm.

14. The pneumatic tire according to claim 13, wherein the radius of curvature RPin on the vehicle inner side ranges from 30 mm to 65 mm.

15. The pneumatic tire according to claim 14, wherein for a total cross-sectional width m a meridian cross-section of the sidewall portions at the tire maximum width portion, a total cross-sectional width on the vehicle inner side is greater than a total cross-sectional width on the vehicle outer side.

16. The pneumatic tire according to claim 15, wherein for a total cross-sectional width in a meridian cross-section of the sidewall portions at the tire maximum width portion, a total cross-sectional width on the vehicle inner side ranges from 12 mm to 20 mm.

17. The pneumatic tire according to claim 16, wherein carcass cords of the carcass layer are made from rayon.

18. The pneumatic tire according to claim 14, wherein for a total cross-sectional width in a meridian cross-section of the sidewall portions at the tire maximum width portion, a total cross-sectional width on the vehicle inner side is greater by 1.0 mm to 5.0 mm than a total cross-sectional width on the vehicle outer side.

19. The pneumatic tire according to claim 18, wherein for a total cross-sectional width in a meridian cross-section of the sidewall portions at the tire maximum width portion, a total cross-sectional width on the vehicle inner side ranges from 12 mm to 20 mm.

20. The pneumatic tire according to claim 19, wherein carcass cords of the carcass layer are made from rayon.

21. The pneumatic tire according to claim 1, wherein the tire side profile joining the intersections of first, second and third straight lines with the tire side profile on the vehicle inner side is a single arc, and the tire side profile joining the intersections of first, second and third straight lines with the tire side profile on the vehicle outer side is a single arc.

22. A pneumatic tire, comprising:
an indicator indicating a designated vehicle inner/outer side orientation for mounting the pneumatic tire on a vehicle;
a reinforcing rubber layer disposed in sidewall portions on both sides in a tire lateral direction, the reinforcing rubber layer having a substantially crescent shaped meridian cross-section; wherein
when the tire is mounted on a regular rim, has an internal pressure of 0 kPa, and is in an unloaded state,
a radius of curvature ROout with an arc joining intersections of first, second and third straight lines with a tire external contour on the vehicle outer side, and a radius of curvature RPout with an arc joining intersections of the first, second and third straight lines with a carcass layer on the vehicle outer side have a relationship such that, on the vehicle outer side, the radius of curvature RPout of the carcass layer is large with respect to the radius of curvature ROout of the tire external contour,
a radius of curvature ROin with an arc joining intersections of first, second and third straight lines with a tire external contour on the vehicle inner side, and a radius of curvature RPin with an arc joining intersections of the first, second and third straight lines with the carcass layer on the vehicle inner side have a relationship such that, on the vehicle inner side, the radius of curvature RPin of the carcass layer is small with respect to the radius of curvature ROin of the tire external contour,
where
the first straight lines on the vehicle inner side and on the vehicle outer side are straight lines orthogonal to a tire equatorial plane at a tire maximum width portion when viewed in a meridian cross section,
the second straight lines on the vehicle inner side and on the vehicle outer side are straight lines from an intersection of the first straight lines and the tire equatorial plane inclined by 10° outward in a tire radial direction with respect to the first straight lines,
the third straight lines on the vehicle inner side and on the vehicle outer side are straight lines from the intersection of the first straight lines and the tire equatorial plane inclined by 10° inward in the tire radial direction with respect to the first straight lines, and
the tire external contour joining the intersections of first, second and third straight lines with the tire external contour on the vehicle inner side is a single arc, and the tire external contour joining the intersections of first, second and third straight lines with the tire external contour on the vehicle outer side is a single arc.

* * * * *